(12) United States Patent
DeGrange et al.

(10) Patent No.: US 7,575,708 B2
(45) Date of Patent: Aug. 18, 2009

(54) DIRECT MANUFACTURE OF AEROSPACE PARTS

(75) Inventors: Jeffrey E. DeGrange, St. Charles, MO (US); Daniel F. Beilman, St. Charles, MO (US); Robert P. Willer, St. Louis, MO (US); Roger L. Spielman, Simi Valley, CA (US); Tracy L. Taylor, Simi Valley, CA (US); Kevin L. Wannemuehler, St. Charles, MO (US); Jeffrey Fink, West Hills, CA (US); Gary G. Bond, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 721 days.

(21) Appl. No.: 11/207,065

(22) Filed: Aug. 18, 2005

(65) Prior Publication Data

US 2005/0278061 A1 Dec. 15, 2005

Related U.S. Application Data

(63) Continuation-in-part of application No. 10/205,451, filed on Jul. 25, 2002, now abandoned.

(51) Int. Cl.
*B29C 35/08* (2006.01)
*B29C 41/02* (2006.01)
*G06F 19/00* (2006.01)

(52) U.S. Cl. .................. 264/497; 264/40.1; 700/119; 700/212

(58) Field of Classification Search ................ 264/40.1, 264/497; 700/119, 212
See application file for complete search history.

(56) References Cited

U.S. PATENT DOCUMENTS

| | | | |
|---|---|---|---|
| 4,863,538 A | 9/1989 | Deckard | |
| 5,017,753 A | 5/1991 | Deckard | |
| 5,132,143 A | 7/1992 | Deckard | |

(Continued)

FOREIGN PATENT DOCUMENTS

EP 0 703 036 A 3/1996

OTHER PUBLICATIONS

Schmachtenberg, E.; Aischer, G.; and Bruing, S., Laser-Sintering of Polyamide, *Kunstoffe* 87 (1997) 6, pp. 1-4.

(Continued)

*Primary Examiner*—Leo B Tentoni
(74) *Attorney, Agent, or Firm*—Harness, Dickey & Pierce, P.L.C.

(57) ABSTRACT

A process of fabricating aerospace parts using selective laser sintering is provided, wherein the process generally comprises the steps of preparing a powder nylon material, loading the powder nylon material into a laser sintering machine, warming up the powder nylon material according to build warm-up parameters, building the part according to build parameters and part parameters, and cooling down the part according to build cool-down parameters. As a result, parts are produced that are directly used in aerospace structures, which meet the stringent performance requirements of aerospace applications, rather than as rapid prototypes as with conventional selective laser sintering processes. Additionally, specific designs for aerospace parts such as ducts, panels, and shrouds are provided that are produced by the selective laser sintering process.

22 Claims, 4 Drawing Sheets

U.S. PATENT DOCUMENTS

| | | |
|---|---|---|
| 5,342,919 A | 8/1994 | Dickens, Jr. et al. |
| 5,639,070 A | 6/1997 | Deckard |
| 5,678,162 A | 10/1997 | Barlow et al. |
| 5,733,497 A * | 3/1998 | McAlea et al. ............ 264/497 |
| 5,749,041 A | 5/1998 | Lakshminarayan et al. |
| 5,990,268 A | 11/1999 | Dickens, Jr. et al. |
| 6,136,948 A | 10/2000 | Dickens, Jr. et al. |
| 6,245,281 B1 | 6/2001 | Scholten |
| 6,630,093 B1 * | 10/2003 | Jones ..................... 264/497 X |
| 6,677,554 B2 * | 1/2004 | Darrah et al. ........... 700/119 X |
| 6,839,607 B2 | 1/2005 | Wooten |

OTHER PUBLICATIONS

XP002213140, Mar. 17, 1972, Germany.
XP000656866, Feb. 21, 1938, Germany.
European Search Report dated Nov. 7, 2003.

* cited by examiner

DIRECT MANUFACTURE OF AEROSPACE PARTS

CROSS-REFERENCE TO RELATED APPLICATIONS

This application is a continuation-in-part of U.S. patent application Ser. No. 10/205,451 filed on Jul. 25, 2002 (now abandoned). The disclosure of the above application is incorporated herein by reference.

FIELD OF THE INVENTION

The present invention relates generally to selective laser sintering and more particularly to production parts and processes using selective laser sintering.

BACKGROUND OF THE INVENTION

Selective laser sintering (SLS) is well known in the art and has traditionally been employed to produce parts known as "rapid prototypes," which are parts that are used to demonstrate a proof of concept or a requirement such as proper form and fit. The selective laser sintering process generally consists of producing parts in layers from a laser-fusible powder that is provided one layer at a time. The powder is fused, or sintered, by the application of laser energy that is directed to portions of the powder corresponding to the cross-section of the part. After sintering the powder in each layer, a successive layer of powder is applied and the process of sintering portions of the powder corresponding to the cross-section of the part is repeated, with sintered portions of successive layers fusing to sintered portions of previous layers until the part is complete. Accordingly, selective laser sintering is capable of producing parts having relatively complex geometries and acceptable dimensional accuracy from a variety of materials such as wax, plastics, metals, and ceramics.

Generally, SLS parts are produced directly from an engineering master definition in a computer aided design (CAD) model. The time required to produce a rapid prototype is therefore significantly shorter than with conventional methods such as sheet metal forming, machining, molding, or other methods commonly known in the art. Unfortunately, powder materials that have been used to date for selective laser sintering generally have relatively low mechanical properties due to the nature of the rapid prototype application. Accordingly, parts formed using selective laser sintering are typically not used within a production design or as production parts due to limited performance capabilities such as low or inconsistent mechanical properties.

Aerospace parts have relatively stringent design requirements compared with parts in other applications, primarily due to operating environments having extremely high loads and temperatures in addition to a relatively high amount of parts in a relatively small volume. For example, aerospace parts are commonly subjected to fluid exposure, pressure cycling, prolonged fatigue loads, buffeting, and a wide range of temperatures in operation, among others, and must further be as lightweight as possible to meet performance objectives. Additionally, aerospace parts such as ECS (environmental control system) ducts typically define relatively intricate shapes in order to route around other parts and aircraft systems within an aircraft. Moreover, aerospace structures must be capable of withstanding impact loads from maintenance, handling, and in the case of military aerospace structures, from threats such armor piercing incendiaries (API) or high explosive incendiaries (HEI). Accordingly, aerospace parts must be designed to accommodate a variety of operating environments and thus have design requirements that are beyond those of non-aerospace parts.

SUMMARY OF THE INVENTION

In one preferred form, the present invention provides a process of fabricating aerospace parts that comprises the steps of preparing a powder nylon material, loading the powder nylon material into a laser sintering machine, warming up the powder nylon material according to build warm-up parameters, building the part according to build parameters, and cooling down the part according to build cool-down parameters. As a result, parts are produced that are directly used in aerospace structures, which meet the stringent performance requirements of aerospace applications, rather than as rapid prototypes or other designs having less stringent performance requirements produced with conventional selective laser sintering processes.

In another form, a process of fabricating aerospace parts is provided that further comprises warming up a powder nylon material according to build warm-up parameters, building the part according to both build parameters and part parameters, and similarly cooling down the part according to build cool-down parameters. Furthermore, specific values for the parameters are provided in other forms of the present invention, which result in parts being produced that have aerospace grade and quality.

In yet other forms of the present invention, aerospace parts are provided that are formed by a process of preparing a powder nylon material, loading the nylon material into a laser sintering machine, warming up the powder nylon material according to build warm-up parameters, building the part according to build and part parameters, and cooling down the part according to build cool-down parameters. The aerospace parts include, by way of example, electrical shrouds, power distribution panels, ducts (e.g. environmental control system), fittings, closures, and conduits, among others.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Additionally, the selective laser sintering process is well known by those having ordinary skill in the art and is not described herein in detail for purposes of clarity.

Figure 1:
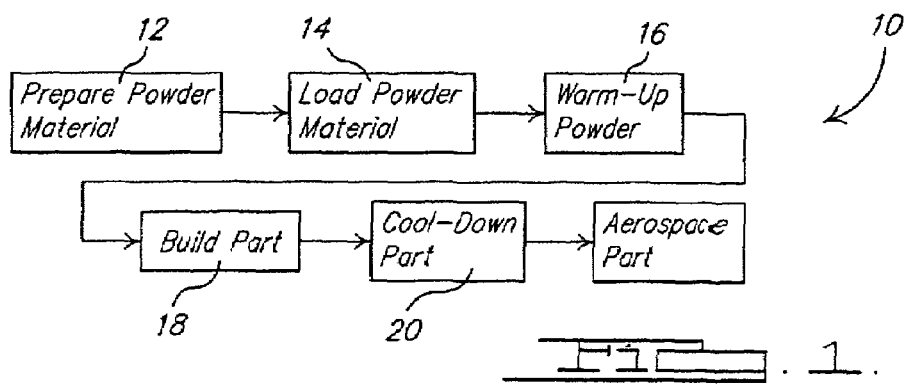
FIG. 1 is a flow diagram illustrating a selective laser sintering process in accordance with the teachings of the present invention.

Referring to FIG. 1, a process of fabricating, or forming, at least one aerospace part according to the present invention is represented in a flow diagram format as indicated by reference numeral 10. As shown, the process generally comprises the steps of preparing a powder material 12, loading the powder material 14 into a laser sintering machine, warming up the powder material 16, building the part 18, and cooling down the part 20. Additionally, the process 10 includes several build and part parameters, which are characterized as either "hidden," "fixed," or "variable." The hidden and fixed parameters are generally provided by the equipment manufacturer and are also a part of the operating software for the laser sintering machine. Preferably, a 2500 Plus Sintering Machine from DTM Corporation, Austin, Tex., is used to fabricate parts in accordance with the present invention. However, the variable parameters are critical parameters that have been developed through extensive research and testing according to the present invention in order to produce parts that are capable of direct application in aerospace structures and systems.

The variable parameters are defined as follows:

Stage Height—Positional Z height for a given stage of the build (i.e., warm up stage, build stage, cool down stage).

Left Feed Distance—An input parameter that controls the distance that the left feed cylinder platen is driven up to eject fresh feed powder to be rolled out across the part bed.

Left Feed Heater Set Point—An input parameter that sets the temperature that the Left Feed Bed closed loop control system (Infra-Red Sensor and plate heater) will maintain.

Minimum Layer Time—An input parameter that controls the minimum amount of time between movements of the roller across the part bed.

Part Heater Set Point—An input parameter that sets the temperature that the Part Bed closed loop control system (IR Sensor and plate heater) will maintain.

Part Heater Inner Outer Ratio—The Part Bed heater is made up of two individual elements an inner element and an outer element, the I/O ratio is a parameter that controls the percentage of the outer element that the inner element is running at (i.e. 0.7~70%). Since there is must be a hole in the part heater for the laser to pass through, the center element must be angled to give good thermal coverage.

Right Feed Distance—An input parameter that controls the distance that the right feed cylinder platen is driven up to eject fresh feed powder to be rolled out across the part bed.

Right Feed Heater Set Point—An input parameter that sets the temperature that the Right Feed Bed closed loop control system (Infra-Red Sensor and plate heater) will maintain.

Fill Beam X Offset—The offset amount adjusts the positional commands to accommodate the laser beam diameter in the X direction only. This increases the dimensional accuracy of the system in the X direction.

Fill Beam Y Offset—The offset amount adjusts the positional commands to accommodate the laser beam diameter in the Y direction only. This increases the dimensional accuracy of the system in the Y direction.

Fill Laser Power—A parameter that controls the laser wattage used when scanning the interior of a part on a given layer.

Sorted Fill Jump—This is a parameter that controls the opening that the scanner will continue to scan across and consider continuous when the Sorted Fill parameter is enabled.

Tglaze—The temperature of the part bed when the first signs of melting (glazing) begins to occur. Build temperatures are based on this.

Build Warm-up Parameter—The temperature parameter set point used during the Build Warm-up Stage.

Build Cool-down Parameter—The temperature parameter set point used during the Build Cool-down Stage.

Each of the hidden, fixed, and variable parameters are listed below in Table I, which include both build parameters and part parameters for each phase of the process 10. Each of the parameters is a function of the specific sintering machine being used, which is the 2500 Plus Sintering Machine from DTM Corporation, Austin, Tex. as previously set forth. Generally, the phases of the process 10 are characterized as a warm-up phase (16), a part build phase (18), and a cool-down phase (20), each of which has separate parameters as listed below.

TABLE I

BUILD AND PART SINTERING PARAMETERS

| | CLASSIFICATION | WARM-UP | BUILD | COOL-DOWN |
|---|---|---|---|---|
| BUILD PARAMETER (units) | | | | |
| Stage Height (in.) | Variable | 0.500-0.855 | N/A | 0.015-0.200 |
| Blower Speed (n/a) | Hidden | 0 | 0 | 0 |
| Fast Add Powder Layer (1 - on, 0 - off) | Hidden | 0 | 0 | 0 |
| Left Feed Distance (in.) | Variable | 0.01 | 0.01 | 0.01 |
| Left Feed Heater Output Limit (%) | Fixed | 80 | 60 | 60 |
| Left Feed Heater Set Point (° Celsius) | Variable | 100-140 | 100-140 | 100-140 |
| Left Feed Heater Wait for Temp (1 - on, 0 - off) | Fixed | 1 | 0 | 0 |
| Minimum Layer Time (sec.) | Variable | 30 | 20-30 | 10 |
| Part Cylinder Heater Enable (1 - on, 0 - off) | Fixed | 1 | 1 | 1 |

TABLE I-continued

BUILD AND PART SINTERING PARAMETERS

| | CLASSIFICATION | WARM-UP | BUILD | COOL-DOWN |
|---|---|---|---|---|
| Part Cylinder Heater Output Limit (%) | Fixed | 100 | 100 | 100 |
| Part Cylinder Heater Set Point (° Celsius) | Fixed | 140 | 140 | 140 |
| Part Heater PID Output Limit (%) | Fixed | 60 | 50 | 50 |
| Part Heater Set Point (° Celsius) | Variable | $T_{glaze}$-2° to $T_{glaze}$-4° C. | $T_{glaze}$-2° to $T_{glaze}$-6° C. | $T_{glaze}$-6° to 45° C. 1/ |
| Part Heater Wait for Temp (1 - on, 0 - off) | Fixed | 0 | 0 | 1 |
| Part Heater Inner/Outer Ratio (%) | Variable | 0.70-1.0 | 0.70-1.0 | 0.70-1.0 |
| Piston Heater Enable (1 - on, 0 - off) | Hidden | 0 | 0 | 0 |
| Piston Heater Output Limit (%) | Hidden | 100 | 100 | 100 |
| Piston Heater Set Point (° Celsius) | Hidden | 150 | 150 | 150 |
| Powder Layer Delay (sec.) | Hidden | 0 | 0 | 0 |
| Powder Layer Thickness (in.) | Fixed | 0.005 | 0.005 | 0.005 |
| Right Feed Distance (in.) | Variable | 0.01 | 0.01 | 0.01 |
| Right Feed Heater Output Limit (%) | Fixed | 80 | 60 | 60 |
| Right Feed Heater Set Point (° Celsius) | Variable | 100-140 | 100-140 | 100-140 |
| Right Feed Heater Wait for Temp (1 - on, 0 - off) | Fixed | 1 | 0 | 0 |
| Roller Speed (in./sec.) | Fixed | 7 | 7 | 7 |
| Rotate Scan Order (1 - on, 0 - off) | Fixed | 0 | 0 | 0 |
| Vector Bloom Elimination (1 - on, 0 - off) | Fixed | N/A | 1 | N/A |
| Maximum Gap Distance (in.) | Hidden | N/A | 0.1 | N/A |
| Fill Beam Offset X (in.) | Variable | N/A | −0.005-0.01 | N/A |
| Outline Beam Offset X (in.) | Hidden | N/A | 0 | N/A |
| Fill Beam Offset Y (in.) | Variable | N/A | −0.005-0.01 | N/A |
| Outline Beam Offset Y (in.) | Hidden | N/A | O | N/A |
| Fill Laser Power (Watts) | Variable | N/A | 15-20 W | N/A |
| Fill Scan Count (1 - on, 0 - off) | Hidden | N/A | 1 | N/A |
| Fill Jump Delay (n/a) | Hidden | N/A | 1000 | N/A |
| Fill Jump Speed (n/a) | Hidden | N/A | 200 | N/A |
| PART PARAMETER (units) | | | | |
| Fill Laser Off (n/a) | Hidden | N/A | 1750 | N/A |
| Fill Laser On (n/a) | Hidden | N/A | 750 | N/A |
| Fill Stroke Delay (n/a) (n/a) | Hidden | N/A | 1900 | N/A |
| Fill Scan Speed (n/a) | Fixed | N/A | 200 | N/A |
| Outline Laser Power (Watts) | Hidden | N/A | 0 | N/A |
| Outline Scan Count (1 - on, 0 - off) | Hidden | N/A | 0 | N/A |
| Outline Jump Delay (n/a) | Hidden | N/A. | 1000 | N/A |
| Outline Jump Speed (n/a) | Hidden | N/A | 66 | N/A |
| Outline Laser Off (n/a) | Hidden | N/A | 1400 | N/A |
| Outline Laser On (n/a) | Hidden | N/A | 985 | N/A |
| Outline Stroke Delay (n/a) | Hidden | N/A | 1800 | N/A |
| Outline Scan Speed (n/a) | Hidden | N/A | 14 | N/A |
| Slicer Fill First (n/a) | Hidden | N/A | 1 | N/A |
| Slicer Fill Scan Spacing (in.) | Fixed | N/A | 0.006 | N/A |
| Sorted Fill Enabled (1 - on, 0 - off) | Fixed | N/A | 1 | N/A |
| Sorted Fill Max Jump (in.) | Variable | N/A | 0.25-0.5 | N/A |

NOTE:
1/ If a part cake must be removed from the machine at a set temperature, there is no control system to maintain the 45° C. part bed temperature during cool down and turn off of the machine. Therefore, in this case, the Operator will have to change the wait-for-temperature during cool down to 0° C. and manually stop the build when the set-point has been reached.

Additionally, the variable parameters that have been developed according to the present invention are listed below in Table II for each of the process phases for both individual parts or parts in a nested part build (more than one part).

TABLE II

IMPORTANT (VARIABLE) BUILD AND PART SINTERING PARAMETERS

| BUILD PARAMETER (units) | CLASSIFICATION | WARM-UP | BUILD | COOL-DOWN |
|---|---|---|---|---|
| Stage Height (in.) | Variable | 0.500 to 0.855 | N/A | 0.015-0.200 |
| Left Feed Distance (in.) | Variable | 0.01 | 0.01 | 0.01 |
| Left Feed Heater Set Point (° Celsius) | Variable | 100-140 | 100-140 | 100-140 |
| Minimum Layer Time (sec.) | Variable | 30 | 20-30 | 10 |
| Part Heater Set Point (° Celsius) | Variable | $T_{glaze}$-2° to $T_{glaze}$-4° C. | $T_{glaze}$-2° to $T_{glaze}$-6° C. | $T_{glaze}$-6° to 45° C. 1/ |
| Part Heater Inner/Outer Ratio (%) | Variable | 0.70-1.0 | 0.70-1.0 | 0.70-1.0 |
| Right Feed Distance (in.) | Variable | 0.01 | 0.01 | 0.01 |
| Right Feed Heater Set Point (° Celsius) | Variable | 100-140 | 100-140 | 100-140 |
| Fill Beam Offset X (in.) | Variable | N/A | −0.005-0.01 | N/A |

TABLE II-continued

IMPORTANT (VARIABLE) BUILD AND PART SINTERING PARAMETERS

| BUILD PARAMETER (units) | CLASSIFICATION | WARM-UP | BUILD | COOL-DOWN |
|---|---|---|---|---|
| Fill Beam Offset Y (in.) | Variable | N/A | −0.005-0.01 | N/A |
| Fill Laser Power (Watts) | Variable | N/A | 15-20 Watts | N/A |
| Sorted Fill Max Jump (in.) | Variable | N/A | 0.25-0.5 | N/A |

NOTE:
1/ If a part cake must be removed from the machine at a set temperature, there is no control system to maintain the 45° C. part bed temperature during cool down and turn off of the machine. Therefore, in this case, the Operator will have to change the wait-for-temperature during cool down to 0° C. and manually stop the build when the setpoint has been reached.

Preferably, the powder material used to fabricate parts according to the present invention is NYLON-11 that contains no additives or fillers. Aerospace parts fabricated from such a nylon material are capable of operating within a temperature range of approximately −65° F. to approximately 215° F.

Process

As previously set forth, the process of fabricating at least one production grade part, and particularly a production grade aerospace part, generally comprises preparing the powder material, loading the powder material into a laser sintering machine, warming up the powder material (warm-up phase), building the part (build phase), and cooling down the part (cool-down phase). Prior to preparing the powder material, thermal characterization tests of the sintering bed are preferably conducted to characterize temperature uniformity over the surface of the sintering bed. One thermal characterization test is a thermal profile test, wherein an aluminum plate with thermocouples is placed in a sintering or part bed and feed heaters are operating at a set-point of 100° C. or greater. Preferably, the temperatures should not vary by more than 4° C. across the part bed. A second thermal characterization test is a thermpat test, wherein an approximate 0.050 inch thick layer of powder material is sintered over the entire surface of the part bed. The thermpat test thus provides an indication of any localized areas that are warmer than surrounding areas. Accordingly, both the thermal profile test and the thermpat test are conducted for each sintering machine that is used to fabricate aerospace parts.

Prior to preparing the powder, the sintering machine is preferably cleaned prior to each build. The cleaning comprises removal and wipe-down of dirt, dust, residue, fused powder, and other types of contamination that might adversely affect proper operation of the sintering machine. More specifically, parts of the sintering machine that are preferably cleaned include a powder feed, the part bed, a laser window and housing, IR (infrared) sensors for both the feed and part bed control, heat deflector shields, roller and roller scraper assemblies, interior walls, and a table top. Additionally, monthly checks of the equipment are conducted that include checking scrapers for wear, checking filters, verifying scale and offset values for the machine, and checking coolant level and operation of an external chiller.

Preparing the Powder Material

The step of preparing the powder material comprises selecting an appropriate material type and quantity and moving the material to a weighing area, where the material is weighed and recorded, along with a lot number, in a log book. The powder material is then placed in a mixer and blended thoroughly for a minimum of approximately 20 minutes. The blended material is then sifted with an approximate 30 mesh screen and packed into a load container until the container is filled to capacity. Next, the container is placed on a vibration table and vibrated until no powder settling is evident. The packed material is then weighed and moved to the laser sintering machine for loading.

Loading the Powder Material

Prior to loading the powder material into the machine, the feed pistons are preferably at an upper limit and a load container is placed on top of one feed chamber. The powder is then loaded into the feed chamber and the process is repeated for a second feed chamber. After filling each feed chamber, the excess material not loaded is removed and preferably weighed and recorded.

Additionally, the part bed is prepared prior to the warm-up phase, wherein a material roller is moved to an extreme right or left position, as necessary, to clear the part bed for the introduction of material. The sifted and packed powder is then added to the part bed and feed bed boundaries, as required, to achieve a uniform distribution of material. The material roller is then activated to move across the build and feed chambers. Further, right and left chamber swing gates are reinstalled, a process chamber door and latch are closed, and the part and feed chambers are then inerted with nitrogen until a targeted oxygen level is attained in accordance with settings of the equipment. Once the chambers are inert, the heaters will begin to heat the powder in the feeds and the part bed to temperatures defined by the process parameters as previously set forth in Table I. When the temperatures are reached, the warm-up phase then begins.

Warm-Up Phase

Figure 2:
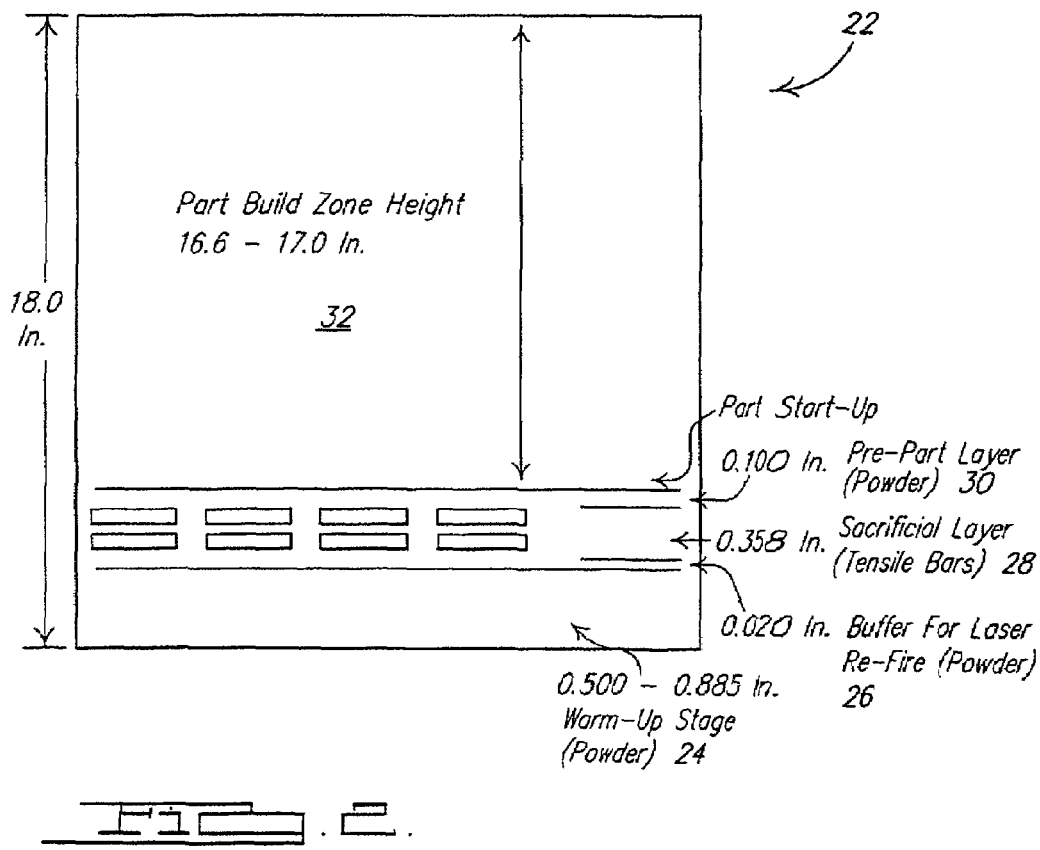
FIG. 2 is a diagram of a part bed configuration in accordance with the teachings of the present invention.

Referring now to FIG. 2, a preferred layout for a part bed 22 is illustrated. According to the process of the present invention, layers of powder are first applied by a roller to create a warm-up stage 24, which comprises approximately 0.500 inch to approximately 0.885 inch of powder. Further, temperatures are ramped up until a warm-up height is reached and endpoint temperatures in feeds and the part bed 22 are set to starting temperatures of the build phase. Additionally, the hidden, fixed, and variable parameters according to Table I as previously set forth are used for the warm-up phase.

Build Phase

The first step in the build phase is a laser re-fire sequence, during which glazing of the entire surface of the sintering bed occurs and a buffer for laser re-fire 26 is created. If glazing occurs, an additional four layers of powder, approximately 0.020 inch total thickness, is applied over the sintering bed to create the buffer for laser re-fire 26. Generally, the purpose of the buffer layer is to provide a buffer to prevent the re-fire laser from fusing to a subsequent layer of sacrificial tensile bars 28, which are formed after the buffer layer 26. The tensile bars, which are fabricated in accordance with ASTM D638 Type I, are tested after part fabrication to verify required physical and mechanical properties of the aerospace parts. These target physical and mechanical properties for a production grade aerospace part made from NYLON-11 are listed below in Table III, and are given across a plurality of temperatures.

instruments such as a flexible metal spatula or a stiff nylon bristle brush. Excess unsintered material is preferably removed from exterior surfaces by wiping or brushing. After the excess material is removed from exterior and interior surfaces, the part is preferably bead blasted using glass beads and a nozzle pressure of approximately 65 psi to approximately 75 psi (pounds per square inch). Finally, all surfaces are blown off using filtered, dry, compressed air, and each part is placed in a polyethylene bag with proper identification and is sealed for further inspection, processing, and subsequent installation into an aircraft or aerospace system. For example, subsequent processing may include applying at least one seal coat and a second seal coat for subsequent bonding purposes. Additionally, seal coats are preferably applied to interior surfaces of aerospace parts that carry pressurized air, such as ECS (environmental control system) ducts, among others.

A working zone or build envelope used for building parts is approximately 13.5 inches long×11.5 inches wide×17 inches

TABLE III

TARGET MATERIAL PROPERTIES FOR PRODUCTION GRADE NYLON-11

| Property (Units) | Temperature | | | | | | | |
|---|---|---|---|---|---|---|---|---|
| | −65° F. | −40° F. | 0° F. | 35° F. | 70° F. | 135° F. | 165° F. | 215° F. |
| Min. Ultimate Tensile Strength, $F_{tu}$ (psi) | 5900 | 5600 | 5000 | 4800 | 4000 | 3000 | 2600 | 1700 |
| Min. Tensile Yield Strength, $F_{ty}$ (psi) | 3500 | 3400 | 3000 | 2900 | 2400 | 1800 | 1600 | 1000 |
| Min. Compression Yield Strength, $F_{cy}$ (psi) | 3500 | 3400 | 3000 | 2900 | 2400 | 1800 | 1600 | 1000 |
| Min. Ultimate Shear Strength, $F_{su}$ (psi) | 3500 | 3400 | 3000 | 2900 | 2400 | 1800 | 1600 | 1000 |
| Min. Ultimate Bearing Strength, $F_{bru}$ (psi) | 11200 | 10700 | 9900 | 9200 | 7600 | 5700 | 5000 | 3200 |
| Typ. Young's Modulus, E (ksi) | 275 | 283 | 295 | 260 | 220 | 100 | 45 | 40 |
| Typ. Coefficient of Thermal Expansion, CTE (in./in./° F.) | $95 \ E^{-6}$ | $95 \ E^{-6}$ | $95 \ E^{-6}$ | $95 \ E^{-6}$ | $95 \ E^{-6}$ | $203 \ E^{-6}$ | $203 \ E^{-6}$ | $203 \ E^{-6}$ |
| Typ. Strain Energy, u (in./in.) | — | — | — | — | 0.40 | — | — | — |
| Min. Elongation % for parts sintered in z direction, $e_z$ (%) | 1 | — | 2 | — | 12 | — | 25 | 30 |
| Min. Elongation % for parts sintered in x-y direction, $e_{xy}$ (%) | 2 | — | 5 | — | 29 | — | 50 | 50 |

NOTE:
Elongation for parts sintered in the z-direction relative to the part build is preferably a minimum of about 10%-15%, and more preferably about 12%.

The next step of the build phase is forming a pre-part layer 30 of approximately 0.100 inch. The pre-part layer 30 serves as a buffer before sintering the actual aerospace parts. Next, fabrication of the aerospace parts is conducted within the part build zone 32 according to the hidden, fixed, and variable parameters in Table I, and the variable parameters as established by the present invention according to Table II, as previously set forth. A further description of the selective laser sintering process is not detailed herein, as the process is well known by those skilled in the art.

Cool-Down Phase

The cool-down phase begins with the deposition of a buffer layer of powder over the part build, which serves as a thermal cap. During the cool-down phase, the nitrogen purge continues to maintain an inert atmosphere in the build chamber at no greater than approximately 0.2% oxygen volume content. Then, the part bed is allowed to cool to approximately 40° C. to approximately 45° C., after which time the sintering machine is opened and the part cake (the fabricated part and excess powder material) is removed.

After the part cake is removed from the machine, "breakout" of the part from the part cake is conducted within a breakout station (BOS). After "breakout," unsintered material is removed from interior surfaces of the parts using clean high with the equipment used with the present invention. Although parts may be fabricated beyond the dimensional constraints of the equipment and subsequently joined using methods such as mechanical fastening or bonding, the process according to the present invention preferably includes fabricating tensile specimens, according to ASTM D638 Type I, to verify consistent mechanical properties in accordance with the mechanical properties listed above in Table III.

In another form of the present invention, recycled material may be used to fabricate the parts. Generally, recycled material is defined as powder that has been used previously in one or more part build processes. Preferably, the material may be reused up to a level of approximately 70% with approximately 30% being unused material. Once a part is fabricated using the recycled material, however, any powder remaining from the part build is preferably not reused unless further testing is conducted to demonstrate that mechanical and physical properties are adequate. Additionally, powder material that is reused is preferably sifted prior to use using a 30 mesh sieve.

Aerospace Part Applications

Figure 3:
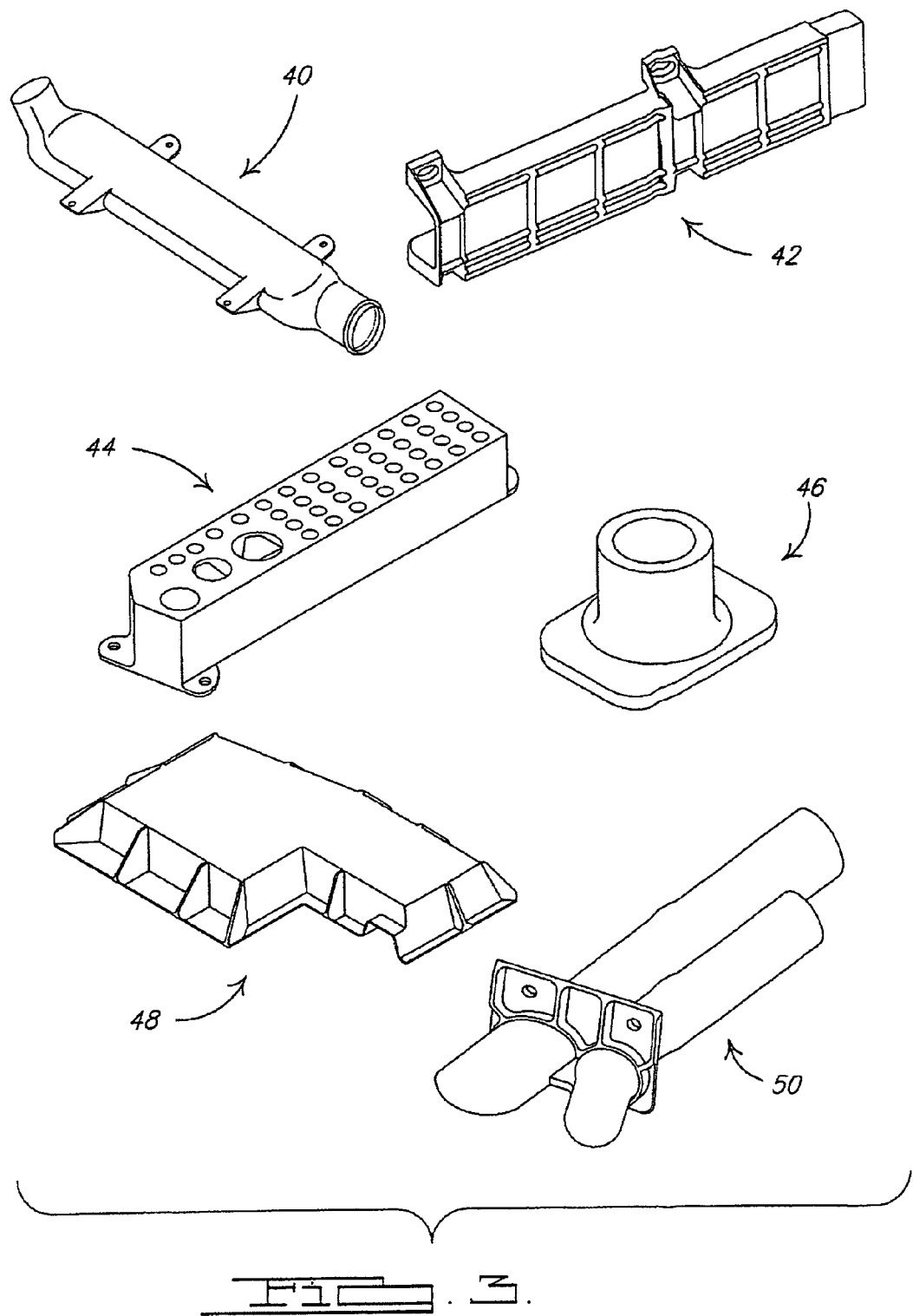
FIG. 3 is a series of perspective views of aerospace parts that can be fabricated according to the process of the present invention.

Referring to FIG. 3, aerospace parts that have to be fabricated using a nylon powder material in the process according to the present invention include ducts 40, electrical shrouds 42, power distribution panels 44, fittings 46, closures 48, and conduits 50, among others. It should be understood by those skilled in the art that other types of powder material other than nylon may also be employed to fabricate the aerospace parts as shown in FIG. 3, in addition to other types of aerospace parts. Accordingly, a unique set of variable parameters would be established for such a material system. Therefore, the reference to a nylon powder material and specific aerospace parts should not be construed as necessarily limiting the scope of the present invention.

Figure 4:
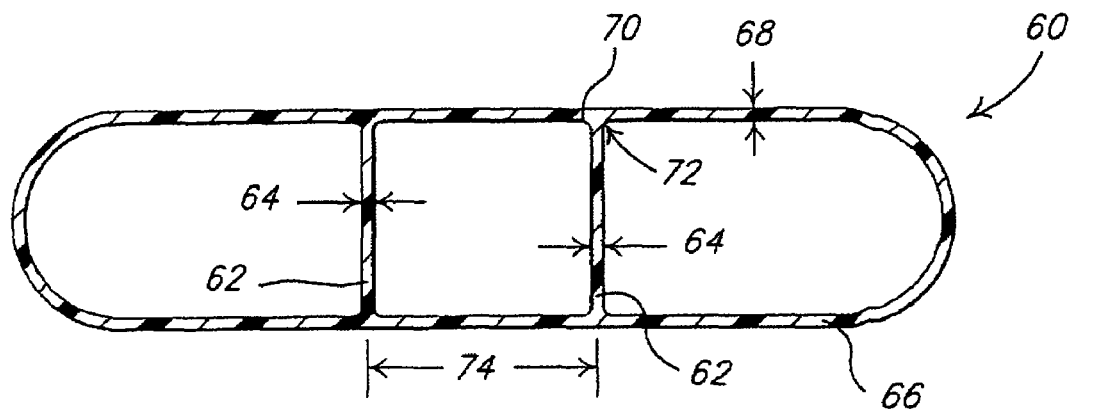
FIG. 4 is a cross-sectional view of an ECS duct fabricated in accordance with the teachings of the present invention.

For the nylon powder material as described herein, the present invention further comprises general design configurations for Environmental Control System (ECS) ducts used in aerospace vehicles. Generally, the ECS ducts provide passageways for temperature-controlled airflow, or other ventilation as required for systems or personnel onboard the aerospace vehicle. Generally, the present invention enables duct configurations that are optimized to reduce internal pressure drop and to hold system pressures. As shown in FIG. 4, a typical ECS duct is illustrated and indicated by reference numeral 60. The ECS duct 60 comprises at least one stiffener 62 having a thickness 64, a wall 66 having a thickness 68, and a plurality of stiffener fillets 70 having radii 72. However, in another form, the ECS duct 60 does not include any stiffeners 62. Preferably, the minimum wall thickness 68 is approximately 0.080 inch, although thinner walls may be employed based on the location of the wall 66 relative to the stiffeners 62 and susceptibility to damage. Although the wall 66 is illustrated as having a constant thickness, the ECS duct 60 may also define walls 66 having a non-constant thickness while remaining within the scope of the present invention. Additionally, the minimum stiffener fillet radii 72 is approximately 0.150 inch, and the minimum stiffener thickness 64 is approximately 0.080 inch. Further, the wall thickness 68 is a function of a stiffener spacing 74, and sample wall thicknesses 68 for a given stiffener spacing 74 with a burst pressure of 14.1 psi (pounds per square inch) at 165° F. are shown below in Table IV.

TABLE IV

DUCT WALL THICKNESS AND STIFFENER SPACING

| Wall Thickness 68 (in.) | Stiffener Spacing 74 (in.) |
|---|---|
| 0.070 | 1.00 |
| 0.090 | 1.25 |
| 0.125 | 1.92 |
| 0.300 | 3.84 |

For pressures other than 14.1 psi, the wall thickness 68 is multiplied by the square root of the ratio of the pressure (p) to a pressure of 14.1 psi as follows: Wall Thickness (64)=($\sqrt{p/14.1}$)×wall thickness in Table I.

Figure 5:
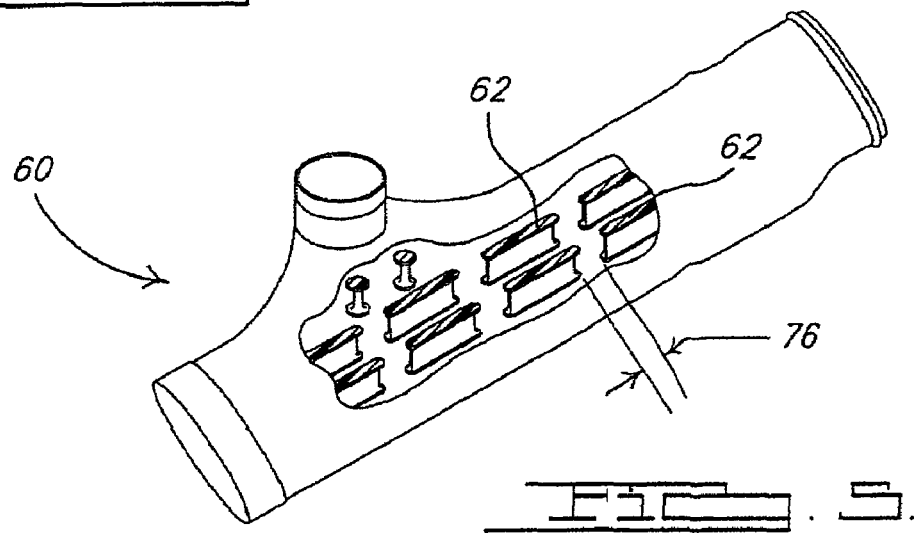
FIG. 5 is a perspective view of an ECS duct illustrating stiffener spacing in accordance with the teachings of the present invention.
Figure 6:
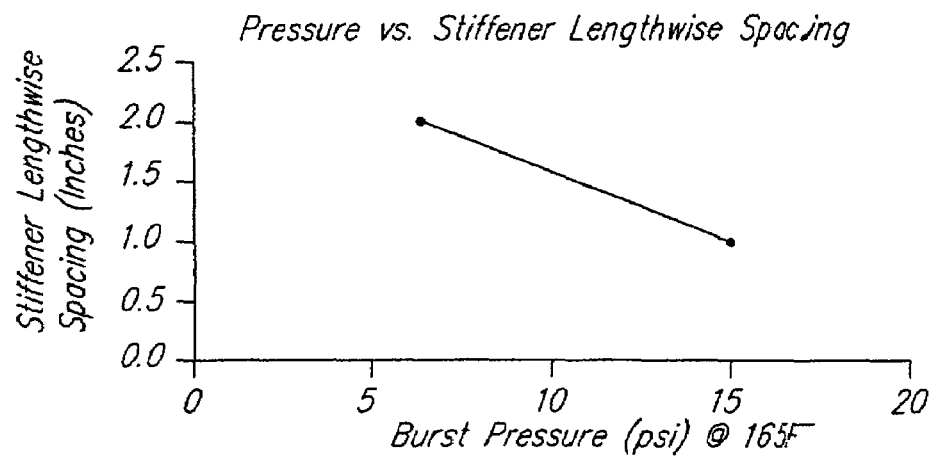
FIG. 6 is a graph illustrating stiffener spacing as a function of burst pressure in accordance with the teachings of the present invention.

Referring now to FIG. 5, lengthwise spacing 76 of the stiffeners 62 is illustrated, wherein the lengthwise spacing 76 is a function of burst pressure. An example of lengthwise spacing 76 versus burst pressure is shown below in FIG. 6, which is based on a wall thickness 68 of approximately 0.080 inch, a stiffener thickness 64 of approximately 0.080 inch, and fillet radii 72 of approximately 0.15 inch. Lengthwise spacing 76 for the wall thicknesses 68, stiffener thicknesses 64, and fillet radii 72 other that those corresponding to FIG. 6 are determined through strength analysis techniques commonly known in the art.

Figure 7A:
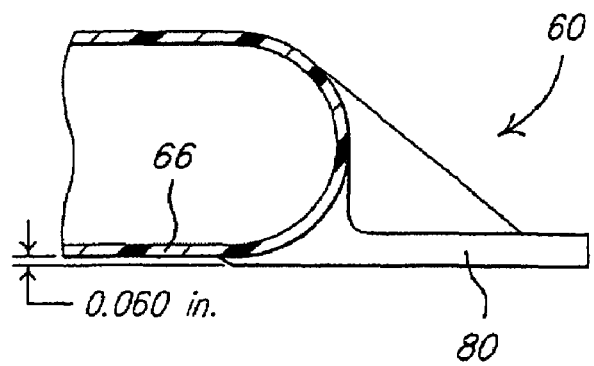
FIG. 7A is a partial cross-sectional view of an ECS duct having an integral lug for mounting in accordance with the teachings of the present invention.
Figure 7B:
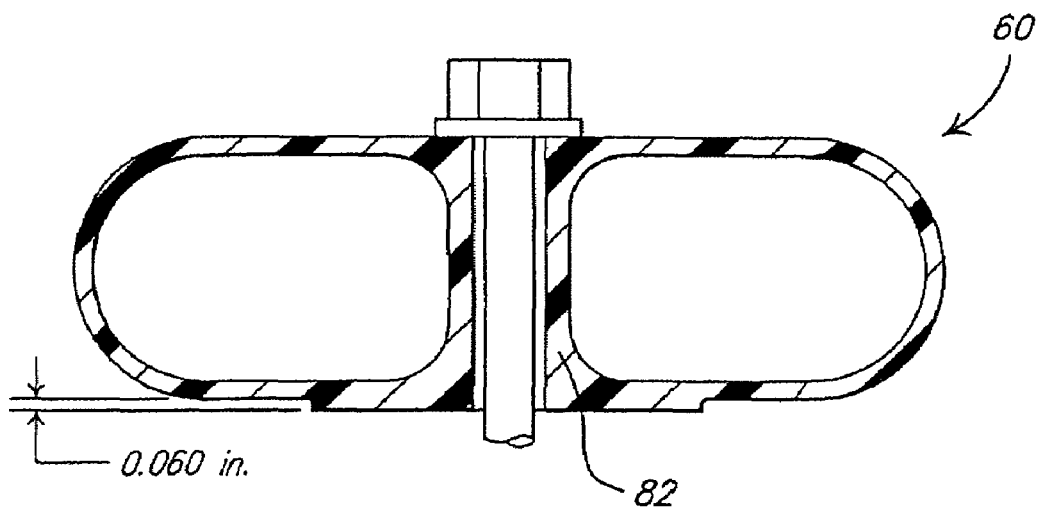
FIG. 7B is a cross-sectional view of an ECS duct having an airflow-internal mounting lug in accordance with the teachings of the present invention.

As shown in FIG. 7A, the ECS duct 60 is typically fastened to adjacent structure through an integral mounting lug 80. Alternately, the ECS duct 60 may comprise an airflow-internal mounting lug 82 as shown in FIG. 7B. Accordingly, the number of fasteners and associated installation time is reduced through the use of the mounting lugs 80 and 82. Preferably, the airflow-internal mounting lug 82 is symmetrical across its section to minimize thermal effects and is further slotted. Moreover, the mounting lug 80 and the airflow-internal mounting lug 82 are preferably offset from the wall 66 approximately 0.060 inch as shown to allow for duct distortion during pressurization.

Figure 8:
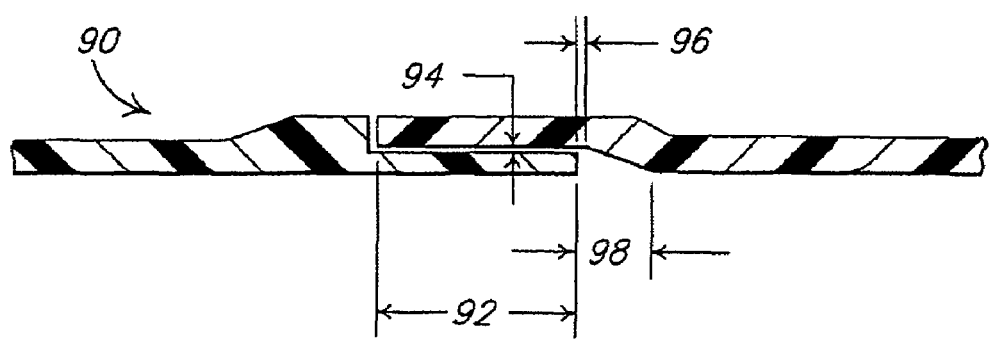
FIG. 8 is a cross-sectional view of a bonded aerospace joint constructed in accordance with the teachings of the present invention.

Referring to FIG. 8, a bonded joint for aerospace parts fabricated using SLS is illustrated and indicated by reference numeral 90. The bonded joint 90 comprises an overlap 92, a bondline offset 94, a fillet radii offset 96, and an OML gap 98. Preferably, the overlap 92 is approximately 0.75 inch, the bondline offset 94 is approximately 0.020 inch, the fillet radii offset 96 is a minimum of approximately 0.05 inch, and the OML gap 98 is a minimum of approximately 0.10 inch in one form of the present invention.

As additional design guidelines, rivets that are installed through the ECS duct 60 are preferably squeezed and not vibration driven in order to reduce the likelihood of cracking. Further, the ECS duct 60 may be restrained with a maximum of approximately 5 lbs. to dimensionally conform to an engineering master model definition.

Further, the production grade parts, and especially production grade aerospace parts, according to the present invention may be bonded together or to an adjacent metal or rubber part using an epoxy adhesive, a silicone adhesive/sealant, or a rubber based contact cement. Additionally, the production grade parts may be coated with a seal coat to seal the aerospace part as required.

Application of Seal Coat

Generally, three parts by volume of a base is mixed with one part by volume of an activator to form the seal coat material, which typically has a pot life of approximately 2.5 to 3 hours. The seal coat material is then applied in either one or two coats to surfaces of the aerospace part as required by an engineering definition. Further, the seal coat material is preferably applied by spraying, brushing, dipping, or flow coating. For internal surfaces such as internal walls of ducts, one end of the duct is capped off and a quantity of the seal coat material is poured into another end, which is subsequently capped off. Then, the duct is rotated in all directions until all surfaces are coated (as typically indicated by a darker color change). Further, the excess seal coat material is drained form the part for a minimum of approximately ten (10) minutes. Seal coated parts are preferably air dried for a minimum of approximately sixty (60) minutes and are force dried for approximately 2 hours at approximately 140±10° F.

Bonding Parts

Generally, when bonding an aerospace part according to the present invention to another aerospace part, whether nylon, metal, rubber, or other, the mating surfaces are solvent cleaned, sanded, and solvent cleaned again after sanding. Then, an appropriate adhesive is mixed and applied to the mating surfaces, which is followed by assembling the parts immediately. The excess adhesive is squeezed out using a wiper or spatula and the adhesive is allowed to cure for a specific period of time and according to a specific cure profile according to the type of adhesive. Further, an adhesion promoting primer may also be applied prior to bonding, such as when a nylon part is bonded to a rubber part using a silicone adhesive/sealant.

The production grade parts, and production grade aerospace parts, produced by this process generally exhibit superior uniformity of material strength, density, and dimensional control characteristics as compared with prototype parts produced using prior art sintering methods. Additionally, the production grade parts produced by this process from NYLON-11 will generally exhibit a part density of about 0.038 lb./in.$^3$ in the uncoated state. A surface coating weight may comprise an additional 10%, depending on the part geometry.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A process of fabricating a production grade aerospace part, the process comprising the operations of:
   loading a powder nylon material into a laser sintering machine;
   warming the powder nylon material according to build warm-up parameters, the build warm-up parameters comprising a stage height, feed distances, heater set points, a minimum layer time, and a part heater inner/outer ratio; and
   building the production grade aerospace part according to build parameters, the build parameters comprising:
   left and right feed heater set points;
   a part heater set point during a warm-up phase of between $T_{glaze}$ −2° C. to $T_{glaze}$ −4° C., and during a build phase of $T_{glaze}$ −2° C. to $T_{glaze}$ −6° C.;
   a fill scan spacing;
   a fill laser power of between about 15-20 watts; and
   a fill scan speed;
   wherein said production grade aerospace part comprises an ultimate tensile strength of at least approximately 4000 pounds per square inch at approximately 70 degrees Fahrenheit.

2. The process of claim 1, further comprising:
   cooling down the part according to build cool-down parameters, the build cool-down parameters comprising at least two of a stage height, feed distances, heater set points, a minimum layer time, and a heater inner/outer ratio.

3. The process of claim 1, wherein the production grade part has an ultimate shear strength of at least about 2400 pounds per square inch.

4. The process of claim 1, wherein the production grade part has an elongation capability along a z-axis of the part of at least about 12 percent.

5. The process of claim 1, further comprising building the production grade part in accordance with a build parameter of a minimum layer time of between about 20-30 seconds.

6. The process of claim 1, wherein the minimum layer time is between about 25-35 seconds.

7. A method of fabricating a production grade aerospace part, the process comprising the operations of:
   loading a powder nylon material into a laser sintering machine;
   warming the powder nylon material according to build warm-up parameters, the build warm-up parameters comprising a stage height, feed distances, heater set points, a minimum layer time, and a part heater inner/outer ratio; and
   building the production grade aerospace part according to build parameters, the build parameters comprising:
   feed distances;
   part heater set point during a warm-up phase of between $T_{glaze}$ −2° C. to $T_{glaze}$ −4° C., and during a build phase of $T_{glaze}$ −2° C. to $T_{glaze}$ −6° C.;
   a minimum layer time of between about 20-30 seconds;
   a heater inner/outer ratio;
   a fill beam offset X;
   a fill beam offset Y; and
   a fill laser power held between about 15-20 watts.

8. The method of claim 7, further comprising building the production grade aerospace part in accordance with a build parameter comprising a sorted fill max jump, and wherein the fill beam X offset is between approximately −0.005 inch (−0.127 mm) and approximately −0.01 inch (−0.254 mm) and the fill beam Y offset is between approximately −0.005 inch (−0.127 mm) and approximately −0.01 inch (−0.254 mm).

9. The method of claim 7, further comprising:
   cooling down the part according to build cool-down parameters, the build cool-down parameters comprising a stage height, feed distances, part heater set points, a minimum layer time, and a heater inner/outer ratio.

10. The process according to claim 7, wherein the stage height build warm-up parameter is between approximately 0.500 inch (12.7 mm) and approximately 0.855 inch (21.71 mm).

11. The process according to claim 7, wherein the feed distances build warm-up parameters further comprise a left feed distance and a right feed distance build warm-up parameter.

12. The process according to claim 11, wherein the left feed distance build warm-up parameter is approximately 0.01 inch (0.254 mm) and the right feed distance build warm-up parameter is approximately 0.01 inch (0.254 mm).

13. The process according to claim 7, wherein the build warm-up parameters further comprise a left feed heater set point build warm-up parameter and a right feed heater set point build warm-up parameter.

14. The process according to claim 13, wherein the left feed heater set point build warm-up parameter is between approximately 100° C. and approximately 140° C. and the right feed heater set point build warm-up parameter is between approximately 100° C. and approximately 140° C.

15. The process according to claim 7, wherein the minimum layer time build warm-up parameter is approximately 30 seconds.

16. The process according to claim 7, wherein the part heater inner/outer ratio build warm-up parameter is between approximately 0.70 and approximately 1.0.

17. The process according to claim 7, wherein the feed distances build parameters further comprise a left feed distance build parameter and a right feed distance build parameter.

18. The process according to claim 17, wherein the left feed distance build parameter is approximately 0.01 inch (0.254 mm) and the right feed distance build parameter is approximately 0.01 inch (0.254 mm).

19. The process according to claim 8, wherein the heater set points build parameters further comprise a left feed heater set point build parameter and a right feed heater set point build parameter.

20. The process according to claim 19, wherein the left feed heater set point build parameter is between approximately 100° C. and approximately 140° C., the part heater set point build parameter is between approximately a $T_{glaze}$ −2° C. and approximately a $T_{glaze}$ −6° C., and the right feed heater set point build parameter is between approximately 100° C. and approximately 140° C.

21. A process of fabricating a production grade aerospace part, the process comprising the operations of:
preparing a powder nylon material;
loading the powder nylon material into a laser sintering machine;
warming up the powder nylon material according to build warm-up parameters, the build warm-up parameters comprising a stage height between approximately 0.500 inch (12.7 mm) and approximately 0.855 inch (21.71 mm), a left feed distance of approximately 0.01 inch (0.254 mm), a right feed distance of approximately 0.01 inch (0.254 mm), a left feed heater set point between approximately 100° C. and approximately 140° C., a part heater set point between approximately $T_{glaze}$ −2° to $T_{glaze}$ −6° C., a right feed heater set point between approximately 100° C. and approximately 140° C., a minimum layer time of approximately 30 seconds, and a part heater inner/outer ratio between approximately 0.70 and approximately 1.0;
building the production grade aerospace part according to build parameters and part parameters, the build parameters comprising a left feed distance of approximately 0.01 inch (0.254 mm), a right feed distance of approximately 0.01 inch (0.254 mm), a left feed heater set point between approximately 100° C. and approximately 140° C., a part heater set point between approximately $T_{glaze}$ −2° C. and approximately $T_{glaze}$ −6° C., a right feed heater set point between approximately 100° C. and approximately 140° C., a minimum layer time between approximately 20 seconds and approximately 30 seconds, and a heater inner/outer ratio between approximately 0.70 and approximately 1.0, and the part parameters comprising a fill beam X offset between approximately −0.005 inch (−0.127 mm) and approximately −0.01 inch (−0.254 mm), a fill beam Y offset between approximately −0.005 inch (−0.127 mm) and approximately −0.01 inch (0.254 mm), a fill laser power between approximately 15 watts and approximately 20 watts, and a sorted fill maximum jump between approximately 0.25 inch (6.35 mm) and approximately 0.5 inch (12.7 mm); and
cooling down the part according to build cool-down parameters, the build cool-down parameters comprising a stage height between approximately 0.015 inch (0.381 mm) and 0.200 inch (5.08 mm), a left feed distance build cool-down parameter of approximately 0.01 inch (0.254 mm), a right feed distance build cool-down parameter of approximately 0.01 inch (0.254 mm), a left feed heater set point build cool-down parameter between approximately 100° C. and approximately 140° C., a part heater set point build cool-down parameter between approximately a $T_{glaze}$ −6° C. and approximately 45° C., a right feed heater set point build cool-down parameter between approximately 100° C. and approximately 140° C., a minimum layer time build cool-down parameter of approximately 10 seconds, and a part heater inner/outer ratio build cool-down parameter between approximately 0.70 and approximately 1.0.

22. A process of fabricating a production grade part, the process comprising the operations of:
loading a powder nylon material into a laser sintering machine;
warming the powder nylon material according to build warm-up parameters, the build warm-up parameters comprising a stage height, feed distances, heater set points, a minimum layer time, and a part heater inner/outer ratio; and
building the production grade part according to build parameters, the build parameters comprising: left and right feed heater set points; a part heater set point for a build phase of about $T_{glaze}$ −2° to $T_{glaze}$ −6° C., and about $T_{glaze}$ −6° to 45° C. for a cool-down phase; a fill scan spacing; a fill laser power of between about 15-20 watts; and a fill scan speed; wherein the production grade part has an ultimate shear strength of at least about 2400 pounds per square inch.

\* \* \* \* \*